(12) United States Patent
Menkhoff et al.

(10) Patent No.: US 11,791,861 B2
(45) Date of Patent: Oct. 17, 2023

(54) METHODS AND TRANSCEIVERS FOR SELF-INTERFERENCE MITIGATION

(71) Applicant: Apple Inc., Cupertino, CA (US)

(72) Inventors: Andreas Menkhoff, Oberhaching (DE); Stefan Fechtel, Zorneding (DE)

(73) Assignee: Apple Inc., Cupertino, CA (US)

(*) Notice: Subject to any disclaimer, the term of this patent is extended or adjusted under 35 U.S.C. 154(b) by 204 days.

(21) Appl. No.: 17/418,696

(22) PCT Filed: Nov. 27, 2019

(86) PCT No.: PCT/US2019/063489
§ 371 (c)(1),
(2) Date: Jun. 25, 2021

(87) PCT Pub. No.: WO2020/139507
PCT Pub. Date: Jul. 2, 2020

(65) Prior Publication Data
US 2022/0069861 A1 Mar. 3, 2022

(30) Foreign Application Priority Data
Dec. 27, 2018 (DE) .................. 102018133632.2

(51) Int. Cl.
*H04B 1/52* (2015.01)
*H04B 1/525* (2015.01)
(Continued)

(52) U.S. Cl.
CPC .......... *H04B 1/525* (2013.01); *H04J 11/0023* (2013.01); *H04L 27/2647* (2013.01); *H04L 27/28* (2013.01)

(58) Field of Classification Search
CPC .. H04B 1/525; H04J 11/0023; H04L 27/2647; H04L 27/28
See application file for complete search history.

(56) References Cited

U.S. PATENT DOCUMENTS

2010/0136900 A1 6/2010 Seki
2015/0326269 A1 11/2015 Ko et al.
(Continued)

FOREIGN PATENT DOCUMENTS

WO 2018183384 A1 10/2018

OTHER PUBLICATIONS

Intellectual Property India, Office Action; Application No. 202117026927; dated Mar. 4, 2022; 6 pgs.
(Continued)

*Primary Examiner* — Nader Bolourchi
(74) *Attorney, Agent, or Firm* — Kowert, Hood, Munyon, Rankin & Goetzel, P.C.

(57) ABSTRACT

The present disclosure relates to a transceiver comprising a transmitter with transformation circuitry configured to transform a frequency-domain transmit symbol from frequency domain to time domain to generate a time-domain transmit signal, a receiver with inverse transformation circuitry configured to transform a time-domain receive signal from time domain to frequency domain to generate a frequency-domain receive symbol, and self-interference cancellation circuitry configured to modify the frequency-domain receive symbol based on at least one frequency-domain transmit symbol and a frequency-domain crosstalk channel estimate of a crosstalk channel between the transmitter and the receiver.

20 Claims, 8 Drawing Sheets

(51) Int. Cl.
   *H04J 11/00*   (2006.01)
   *H04L 27/26*   (2006.01)
   *H04L 27/28*   (2006.01)

(56) References Cited

U.S. PATENT DOCUMENTS

2016/0226653 A1  8/2016  Bharadia et al.
2018/0006794 A1  1/2018  Lee et al.
2018/0159677 A1  6/2018  Khandani

OTHER PUBLICATIONS

International Search Report and Written Opinion for International Application No. PCT/US2019/063489, dated Mar. 26, 2020, 7pgs.

METHODS AND TRANSCEIVERS FOR SELF-INTERFERENCE MITIGATION

This application is a U.S. National Stage filing of International Application No. PCT/US2019/063489, filed Nov. 27, 2019, titled "METHODS AND TRANSCEIVERS FOR SELF-INTERFERENCE MITIGATION", which claims the benefit of priority to the German Application No. 102018133632.2, filed Dec. 27, 2018. All of the aforementioned applications are incorporated herein by reference in their entireties.

FIELD

The present disclosure relates to transceiver apparatuses and methods for self-interference cancelation or mitigation and, more particularly, to Self-Interference Cancelation (SIC) for multicarrier transceivers.

BACKGROUND

5G NR (New Radio) is a new multicarrier communication standard that is being defined now. From RF perspective 5G NR will feature more bands (~50), higher bandwidth and more complex modulation schemes in the uplink/downlink compared to previous cellular communication standards. Mobile terminals may have to support simultaneous transmission (TX) and reception (RX) in different bands, up to 200 MHz aggregated TX-bandwidth (2×100 MHz) in sub-6 GHz and more than 1 GHz in mm wave range (>24 GHz). Expensive high attenuation analogue filters are used to separate TX from RX band. Nevertheless through all these combinations of different clocks, bands and unwanted spurious parts of the TX band are modulated back into the RX band. Since analog spurious free design is quite difficult, there will appear with more and more supported band combinations and more cases were the TX signal is modulated into the actual received RX band through the Radio Frequency (RF) frontend (power amplifier, duplexer, switches, etc.).

Thus, there is a demand for improved Self-Interference Cancellation (SIC) techniques. SIC generally refers to signal processing techniques that enable a radio transceiver to simultaneously transmit and receive on a single channel, a pair of partially-overlapping channels, or any pair of channels in the same frequency band. When used to allow simultaneous transmission and reception on the same frequency, sometimes referred to as "in-band full-duplex" or "simultaneous transmit and receive," SIC can effectively double spectral efficiency. SIC may also enable devices and platforms containing two radios that use the same frequency band to operate both radios simultaneously.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
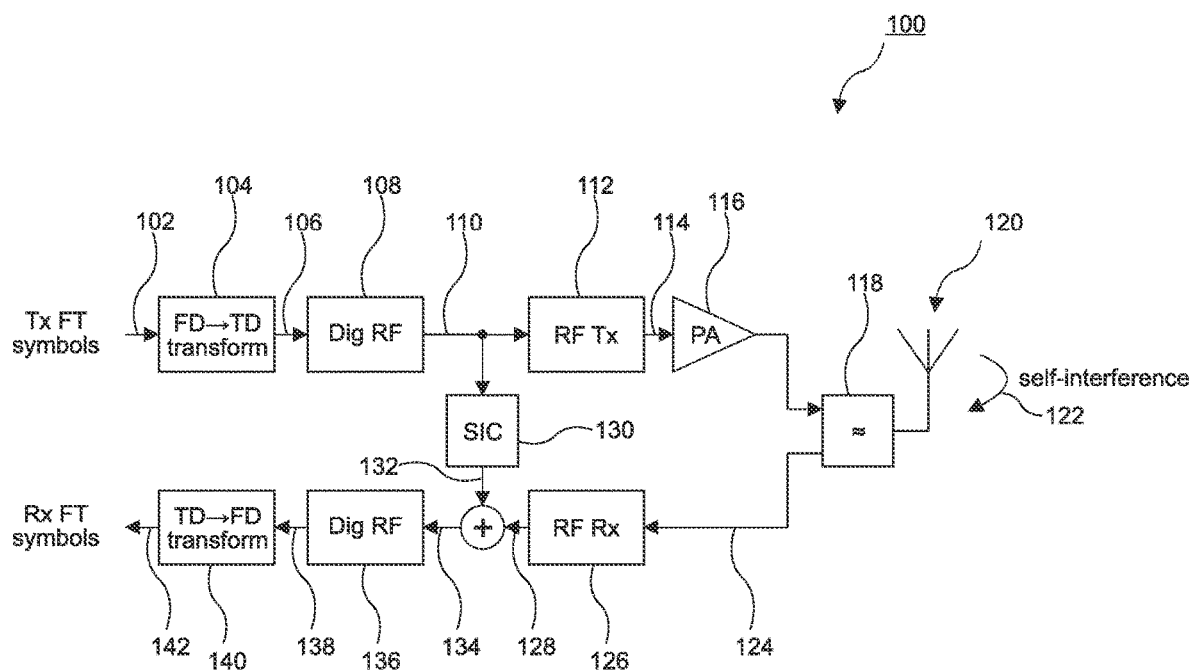
FIG. 1 illustrates a block diagram of a conventional multicarrier transceiver with time-domain SIC.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Due to a tremendous increase in wireless data traffic, one of the major challenges for future wireless systems is the utilization of the available spectrum to achieve better data rates over limited spectrum. Currently, systems operate in what is termed "Half Duplex Mode," where they are either transmitting or receiving, but not both, using the same temporal and spectral resources. Full-duplex transmission promises to double the spectral efficiency where bidirectional communications is carried out over the same temporal and spectral resources. The main limitation impacting full-duplex transmission is managing the strong self-interference signal imposed by the transmit antenna on the receive antenna within the same transceiver. One key challenge in practical full-duplex systems is un-cancelled self-interference power caused by a combination of hardware imperfections, especially RF circuits' impairments.

Conventional solutions for self-interference cancelation (SIC) work in the time-domain. This is in principle shown by the block diagram of multicarrier transceiver 100 in FIG. 1.

In a transmitter portion of transceiver 100, a frequency-domain multicarrier TX symbol 102 is converted from frequency-domain to time-domain by transformation circuitry 104 to obtain a digital time-domain baseband signal 106. For example, the frequency-domain multicarrier TX symbol 102 can comprise N complex source symbols (corresponding to N subcarriers) which are treated by the transmitter as though they are in the frequency-domain and are the inputs to transformation circuitry 104 that transforms the data into the time-domain. The transformation circuitry 104 takes in N source symbols at a time where N is the number of subcarriers in the system. Each of these N input symbols can have a symbol period of T seconds. Different symbol periods for different subcarriers are also possible. The output of the transformation circuitry 104 can be N (e.g. orthogonal) sinusoids. These (orthogonal) sinusoids each have a different (subcarrier) frequency. The N input symbols comprised of the frequency-domain TX symbol 102 are complex values representing the mapped constellation point and therefore specify both the amplitude and phase of the sinusoid for that subcarrier. The frequency-domain to time-domain transformation output 106 is the summation of all N sinusoids. Thus, the transformation circuitry 104 provides a simple way to modulate data onto N (orthogonal) subcarriers. A block of N output samples from the transformation circuitry 104 makes up a single time-domain multicarrier TX symbol 106. The time-domain multicarrier TX symbol 106 can then be further processed (e.g., guard-interval insertion) by digital signal processing circuitry 108. An output 110 of digital signal processing circuitry 108 can be digital-to-analog converted and up-converted to an analog time-domain RF signal 114 by using an RF transmitter frontend 112 comprising one or more mixer stages. Analog time-domain RF signal 114 can then be amplified via power amplifier (PA) 116 before being transferred to antenna 120 via duplexer 118. The transmitted RF signal can interfere with spectrally overlapping RF signals received at antenna 120 and/or other optional antennas (not shown) of transceiver 100. This interference 122 between the TX signal and the RX signal is commonly referred to as self-interference.

In a receiver portion of transceiver 100, a received RF signal 124 (containing self-interference from the transceiver's transmitter portion) is analog-to-digital converted and converted to baseband using RF receiver frontend 126. A digital time-domain output signal 128 of RF receiver frontend 126 can be combined with digital time-domain SIC cancelling signals 132 generated by time-domain SIC processor 130 coupled between time-domain TX signal 110 and time-domain RX signal 128. A resulting time-domain SIC canceled signal 134 can then be further processed (e.g., guard-interval extraction) by a digital signal processing block 136. The resulting time-domain multicarrier RX symbols 138 can then be converted from time-domain to frequency-domain by inverse transformation circuitry 140 to obtain frequency-domain multicarrier RX symbols 142.

The skilled person having benefit from the present disclosure will appreciate that time-domain multicarrier signals can be generated by various kinds of frequency-time-transformations. Likewise, the receiver portion's inverse transformation circuitry 140 can implement any kind of time-frequency-transformation matching the transmitter's frequency-time-transformation. Popular examples of such transformations are the Inverse Fast Fourier Transform (IFFT) and the Fast Fourier Transform (FFT), which are commonly used for OFDM systems, such as LTE, for example.

FIG. 1 illustrates a conventional SIC concept built up in time-domain: In the modulated spur case the time-domain TX signal 110 is time delayed, frequency shifted, adaptive linear filtered (including rotation) by time-domain SIC processor 130 and then subtracted from the RX signal 128. Time-domain SIC processor 130 can also be referred to as a time-domain SIC equalizer. During factory calibration, adaptive filter coefficients of time-domain SIC processor 130 can be determined without RX noise. In the field, however, temperature variations, voltage standing wave ratio (VSWR) variations as well as other impacts can require ongoing (slowly) adaptation of the filter coefficients.

There may be various issues with conventional time-domain SIC concepts. For example, there is a lot of redundancy in the time-domain signals. Original QPSK/16/64/256QAM frequency-domain source symbols of the frequency-domain multicarrier TX symbol 102 may be 1/2/3/4 bit I/Q signals that can be converted via a fast Fourier Transform (FFT) into 12 bit I/Q time-domain TX signals. Further, an FFT of transformation circuitry 104 can be used for time-domain interpolation of the signal, e.g. for LTE20 2192 time-domain samples are generated (2048+144 guard interval) from 1200 FFT bins. Then for QPSK LTE20 1200 I/Q symbol bits are via FFT converted to 24112 I/Q bits (24112=2192*11). This redundancy typically yields higher current consumption.

Figure 2:
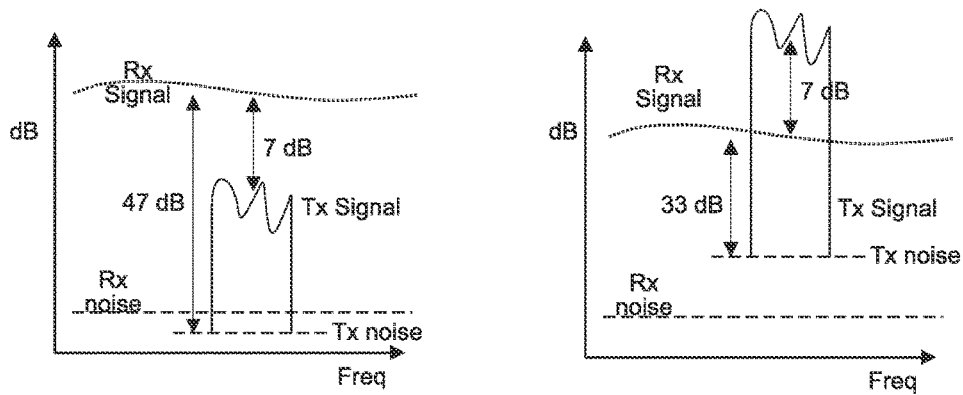
FIG. 2 shows two scenarios at a receiver where an interfering TX signal level is lower (left) and higher (right) than an RX signal level.

Also, it can happen that the RX signal is stronger than the TX signal, however the TX signal is still strong enough to destroy the EVM of the RX signal. This is shown on the left-hand side of FIG. 2. The condition in the left picture is worse for the time-domain SIC processor 130 (equalizer) adaptation since the TX error signal is widely disturbed by the RX signal.

It can happen that an RF TX frontend transfer function is easy and short. In this case the time-domain SIC adaptive algorithm may calculate a high overdetermined equation system with multiple similar solutions. So it may be highly over-dimensioned and busy with noise, especially in the case shown on the left-hand side of FIG. 2. It can happen that the condition number of the matrix gets very high since the adaptive filter of time-domain SIC processor 130 gets correlated input for adaptation. Special means have to be taken into the circuitry to come around with this case. There may be problems with diverging unstable coefficients during adaptation process.

On the other hand, it may happen at other frequencies or with other duplexers that a TX signal that passes a stopband attenuation of the duplexer 118 falls into the RX band. Thus a frequency response of the stopband of the duplexer has to be modeled by the linear equalizer of time-domain SIC processor 132. Duplexers are analogue filters, these are typical recursive filters. However, the digital model is a transversal filter for stability reasons. Typically, no constraints are put to the duplexer stopband characteristic. The statistics of many duplexers show that there are really problematic duplexers in the field. For such duplexers a digital feedforward equalizer of time-domain SIC processor 132 may not be good enough since the time-domain SIC adaptive algorithm has to solve an undetermined equation system. Therefore the suppression of the TX noise into the RX band can vary between 1.5 dB . . . 50 dB for a given circuitry, depending on whether the underlying SIC equation system is undetermined or fitting to the problem.

Figure 3:
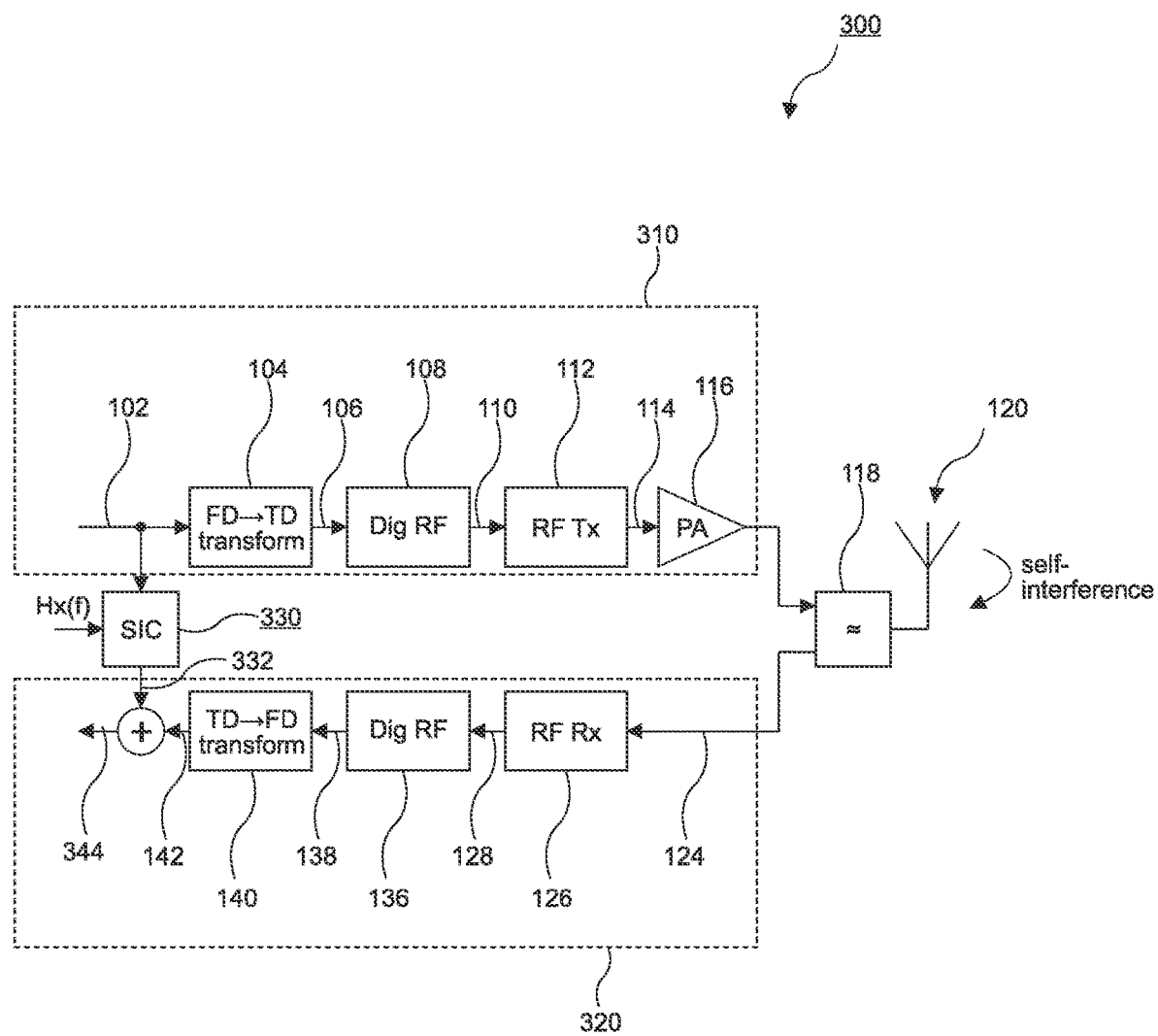
FIG. 3 illustrates a block diagram of a transceiver with frequency-domain SIC.

To address at least some of the aforementioned issues of conventional time-domain SIC, the present disclosure proposes to perform SIC purely in the frequency-domain. A corresponding example multicarrier transceiver 300 is shown in FIG. 3. For example, multicarrier transceiver 300 may be implemented in a mobile terminal. For the sake of brevity a detailed description of circuit blocks of transceiver 300 already described for the transceiver 100 of FIG. 1 will be omitted.

The multicarrier transceiver 300 comprises a transmitter 310 including transformation circuitry 104 configured to transform a frequency-domain multicarrier TX symbol 102 from frequency-domain to time-domain in order to generate a time-domain multicarrier TX symbol/signal 106. The transceiver 300 also comprises a receiver 320 including inverse transformation circuitry 140 configured to transform a time-domain multicarrier RX symbol 138 from time-domain to frequency-domain in order to generate a frequency-domain multicarrier RX symbol 142. In the example of FIG. 3, frequency-domain SIC circuitry 330 is coupled between the transmitter 310 and the receiver 320, or, more particularly, between the frequency-domain multicarrier TX symbol 102 and the frequency-domain multicarrier RX symbol 142. The frequency-domain SIC circuitry 330 is configured to modify the frequency-domain multicarrier RX symbol 142 based on at least the frequency-domain multicarrier TX symbol 102 and a frequency-domain (multicarrier) crosstalk channel estimate $H_x(f)$ of a crosstalk channel between the transmitter 310 and the receiver 320. In other words, the SIC circuitry 330 completely operates in the frequency-domain and signal processing is performed using frequency-domain representations of the transmit and receive signals.

As already explained with reference to FIG. 1, the transmitter's 310 transformation circuitry 104 can implement any kind of frequency-time-transformation. Likewise, the receiver's 320 inverse transformation circuitry 140 can implement any kind of time-frequency-transformation, matching the transmitter's frequency-time-transformation. Thus, the transmitter's transformation circuitry 104 can be configured to transform the frequency-domain multicarrier TX symbol 102 from frequency-domain to time-domain via one of an inverse (Fast) Fourier transform, an inverse Wavelet transform, an inverse Laplace transform, an inverse discrete cosine transform, or using filter banks (arrays of band-pass filters separating an input signal into multiple components, each one carrying a single frequency sub-band of the input signal). Correspondingly, the receiver's 320 inverse transformation circuitry 140 can be configured to transform the time-domain transmit signal 138 from time-domain to frequency-domain based on one of a (Fast) Fourier transform, a Wavelet transform, a Laplace transform, a discrete cosine transform, or filter banks. The skilled person having benefit from the present disclosure will appreciate that the examples are not exhaustive.

Although the skilled person having benefit from the present disclosure will appreciate that the teachings of the present disclosure are not limited to 4G (LTE) or 5G (NR) cellular communication systems, the general concept will be explained by using the example of Orthogonal Frequency Division Multiplexed (OFDM) signals, which are well known multicarrier signals in the field of telecommunication systems. Thus, in some implementations, the frequency-domain multicarrier TX symbol 102 can be a frequency-domain OFDM TX symbol. The time-domain multicarrier TX symbol/signal 106 can be a time-domain OFDM TX symbol/signal. Correspondingly, the time-domain multicarrier RX signal/symbol 138 can be a time-domain OFDM RX signal/symbol and the frequency-domain multicarrier RX symbol 142 can be a frequency-domain OFDM RX symbol 142. Thus, the multicarrier transceiver 300 can be an OFDM transceiver comprising an OFDM transmitter portion 310 and an OFDM receiver portion 320. The OFDM transmitter portion 310 can comprise an Inverse Fast Fourier Transform (IFFT) processor 104 which is configured to transform a frequency-domain OFDM TX symbol 102 to a time-domain OFDM TX signal 106. The OFDM receiver portion 320 can comprise a Fast Fourier Transform (FFT) processor 140 which is configured to transform time-domain OFDM RX signal 138 to a frequency-domain OFDM RX symbol 142. SIC circuitry 330 in this example is configured to perform SIC based on modifying the frequency-domain OFDM RX symbol 142 using at least the frequency-domain OFDM TX symbol 102 and a frequency-domain crosstalk channel estimate of a crosstalk channel from the transmitter 310 to the receiver 320.

It has been found that performing SIC purely in the frequency-domain can yield higher quality with less current consumption compared to conventional time-domain SIC. Higher quality may allow using less performant analog filters, thus saving money and printed circuit board (PCB) area. Frequency-domain SIC can have the following further advantages compared to conventional time-domain SIC:

1a) The TX signal has to be delayed for cancelling the RX signal (roundtrip delay of BB TX, Digital RF, RF TX, analog RF TX, analogue RF RX, Digital RF RX, Dig. RF, BB RX). Delaying of 1, 2, 3, 4 bit frequency-domain source symbols needs less memory/area/current then delaying 12 bit time-domain TX signal for I/Q.

1b) The complex filter taps of the SIC equalizer need less memory/area/current when the TX symbol word-length is only 1, 2, 3, 4 bit instead of TX time signal word-length of today 15 bit.

1c) In time-domain the whole signal has to be cancelled, in frequency-domain the guard interval as well as unused FFT bins can be neglected. For example, LTE20 with 50% TX to RX overlap: 2192 samples in time-domain vs. 600 FFT bins in frequency-domain.

2) In frequency-domain the order of TX SIC versus RX signal reception can be interchanged. In the bad case of FIG. 2 (left-hand side) the RX signal could be decoded (with some errors) first. Then the spurious TX signal can be estimated and subtracted from the RX signal in a second step. Due to less noise inside SIC adaptation this can reduce settling time significantly.

3) In frequency-domain all FFT bins are orthogonal to each other, in time-domain the IQ samples are partly correlated due to redundancy. Thus in frequency-domain the settling procedure of the coefficients is stable, there no need to calculate a condition number of a matrix.

4) The resolution of the frequency-domain SIC equalizer 330 can be chosen equal to the resolution of the receiver 320. Thus a stable frequency-domain SIC equalizer 330 can be built with very high quality.

5) Conventional SIC equalizers need the FFT and IFFT to transfer the signal from time to frequency-domain and back again. Here, the FFT and IFFT processors already exist in the overall TX/RX system, thus the most expensive parts of the frequency-domain SIC equalizer can be reused.

Typically, an OFDM receiver comprises a timing and a carrier frequency recovery. Ideally, the OFDM receiver 320 can capture an integer number of waveforms, one per FFT bin. By these means the orthogonality of the FFT can be recovered, as can be seen in FIG. 4.

Figure 4:
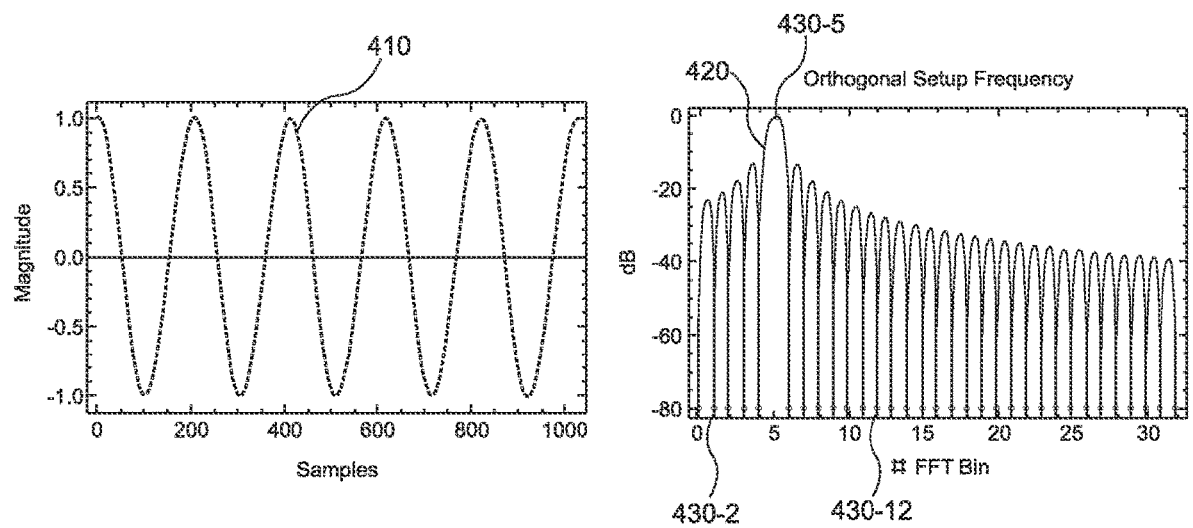
FIG. 4 shows a time- and frequency-domain representation of an ODFM symbol.

Curve 410 of FIG. 4 illustrates a time-domain representation of a single subcarrier of an OFDM symbol comprising 1024 discrete time samples in this example. As can be seen, the example subcarrier signal 410 undergoes 5 oscillations within the 1024 time samples. Plot 420 (right) shows the frequency-domain representation of the single subcarrier OFDM symbol 410 obtained with an example FFT of size 32. Reference numerals 430 denote values of the discrete time sampled signal having a value of 1 in FFT bin #5 (corresponding to the 5 oscillations). Due to orthogonality, the discrete time samples 430 are positioned exactly in the zeros of the analog FFT.

With regard to SIC, a sample 430-$j$ of curve 420 at RX subcarrier m can be expressed by $$\frac{\sin[(n-m)\pi]}{(n-m)\pi} \tag{1}$$

where n denotes a TX subcarrier index of the self-interfering TX signal. In the example of FIG. 4 (no frequency and time offset between TX and RX symbols) this means that TX subcarrier n only affects RX subcarrier m=n. Adjacent RX subcarriers are not affected due to orthogonality.

In a scenario with time and frequency synchronization between TX and RX signals, there are essentially no significant carrier frequency and time offsets between multicarrier TX signal and multicarrier RX signal, meaning that a multicarrier TX symbol is perfectly aligned in time and (subcarrier) frequency with a multicarrier RX symbol. Here, only the crosstalk channel $H_x(f)$ between TX and RX needs to be taken into account for SIC. For such cases, the frequency-domain SIC circuitry 330 can be configured to weight the frequency-domain multicarrier TX symbol 102 with the frequency-domain crosstalk channel estimate $H_x(f)$ and subtract the result from the frequency-domain RX symbol 142 in order to cancel the TX self-interference in the frequency-domain multicarrier RX symbol 142. The skilled person having benefit from the present disclosure will appreciate that the frequency-domain crosstalk channel estimate $H_x(f)$ can be estimated using conventional methods. In one example, known pilot symbols can be used for crosstalk channel estimation, such as least-squares (LS) channel estimation, for example. The skilled person will further appreciate that, depending on the circumstances, the crosstalk channel can be different for different subcarriers of a multicarrier signal, such as an OFDM signal.

Figure 5:
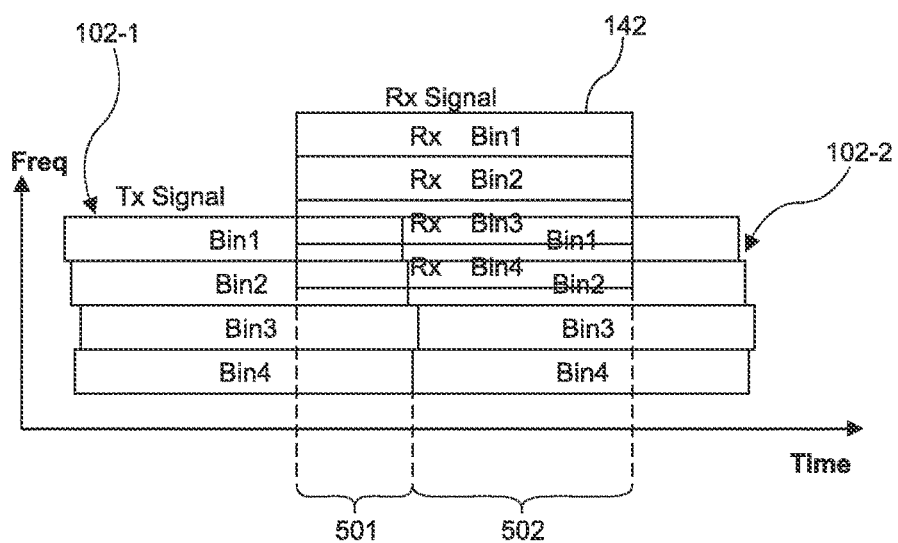
FIG. 5 illustrates spectral and temporal overlap of interfering TX and RX OFDM symbols.

More generally, however, the TX signal will usually not be perfectly aligned with the RX signal. In frequency-domain the spur frequency can be more or less arbitrary, thus TX and RX may overlap partly in frequency-domain. Additionally or alternatively, the timing of TX and RX OFDM symbols may be not synchronized, so usually each RX OFDM symbol can temporally overlap with two or even more OFDM symbols (depending on a subcarrier data rate). This is shown in FIG. 5, schematically illustrating a multicarrier RX symbol 142 overlapping a first and a second multicarrier TX symbols 102-1, 102-2 both in time and frequency.

In an example, the TX signal may be delayed in time-domain by such an amount that the reception of base station OFDM symbols and the TX OFDM symbols are time-aligned with each other. Thus, the TX OFDM symbols and RX OFDM symbols may only have a (carrier) frequency offset against each other. Today for LTE about ½ µs time inaccuracy is allowed (3GPP) and ½ OFDM symbol would have to be covered for shift. ½ OFDM symbol is 33 µs, but in other environments this may be feasible. Delaying by 33 µs would mean that a mobile terminal is virtually displaced by $3\times10^8$ [m/s]$\times33\times10^{-6}$ [µs]=10 km. For shorter FFT length in 5G the situation may be different.

Figure 6:
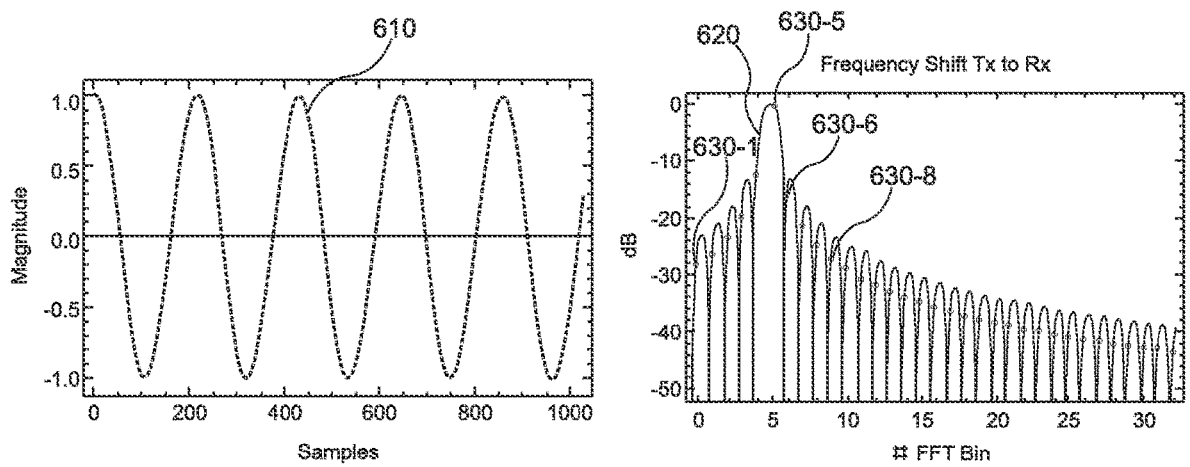
FIG. 6 shows a time- and frequency-domain representation of a frequency-shifted ODFM symbol.

FIG. 6 illustrates a scenario where an interfering frequency-shifted TX signal (with respect to the RX signal) is received by receiver 320.

In FIG. 6, there is no significant time shift between transmit signal and receive signal at TX and RX antennas (temporally aligned TX and RX symbols), however a non-negligible (carrier) frequency offset between the TX and RX signal. This may be due to different up- and downlink frequencies, for example. Additionally or alternatively such a frequency offset may be due to Doppler shifts. Plot 610 of FIG. 6 illustrates a time-domain representation of a single subcarrier of a frequency-shifted OFDM symbol comprising 1024 discrete time samples. Compared to FIG. 4, signal 610 undergoes less than 5 oscillations within the 1024 time samples (due to the frequency offset). Plot 620 (right) shows the frequency-domain representation of the frequency-shifted single subcarrier OFDM symbol 610, shown are the FFT bins from 0 to 32, for an example. Reference numerals 630 denotes values of the discrete signal sampled at the FFT bin centers. It can be seen that orthogonality is lost due to the frequency offset between the OFDM RX and TX signals. The FFT leakage of the frequency shifted OFDM TX signal gets clearly visible. In frequency-domain it looks like the analog frequency-domain signal is sampled with an offset in time discrete version (points 630 in FIG. 6 right).

A sample 630-$m$ of curve 620 at RX subcarrier m (bold points) can be expressed by $$\frac{\sin[(m-f_{TX})\pi]}{(m-f_{TX})\pi} \quad m = \{0, 1, \ldots, 32\} \tag{2}$$

where the self-interference TX subcarrier has in FIG. 6 a length of 4.8 periods (oscillations) regarding the Rx FFT grid ($f_{TX}$=4.8). The index "m" denotes the RX subcarrier that is interfered by the TX leakage subcarrier with $f_{TX}$=4.8. FIG. 6 shows that leakage of one TX subcarrier interferes a bunch of RX subcarriers. Vice versa one RX subcarrier will be interfered by a bunch of TX leakage subcarriers. If we consider a fractional frequency shift Δf (in FIG. 6 Δf=−0.2) between the RX and the TX leakage subcarrier, one RX subcarrier "m" will be interfered by the sum of multiple TX subcarriers "n". Thus, a self-interference coefficient for RX subcarrier m can be expressed as $$y_m = h_m \cdot \sum_n \frac{\sin[(m-(\Delta f + n))\pi]}{(m-(\Delta f + n))\pi} \cdot x_n \quad (3)$$

where "$h_m$" denotes the cross talk channel at the m-th subcarrier

In the illustrated example, TX subcarrier #5 affects RX subcarrier #1 with a weight according to sample 630-1. TX subcarrier #5 affects RX subcarrier #2 with a weight according to sample 630-2. TX subcarrier #5 affects RX subcarrier #5 with a weight according to sample 630-5. TX subcarrier #5 affects RX subcarrier #6 with a weight according to sample 630-6, and so on. Thus, in order to take into account the frequency offset Δf between RX and TX signals, the SIC circuitry 330 can be configured to compute a crosstalk from an OFDM TX subcarrier n to an OFDM RX subcarrier m based on a distance between the subcarriers n, m and based on the frequency offset Δf. Typically, the frequency offset Δf between TX and RX may be known due to predefined system parameters and/or due to Doppler frequency offset estimation techniques. In the specific case of an OFDM transceiver, the SIC circuitry 330 can be configured to compute the crosstalk from OFDM TX subcarrier n to OFDM RX subcarrier m based on weighting the frequency-domain crosstalk channel estimate (for subcarrier m) $h_m$ with an additional crosstalk coefficient corresponding Eq. (2) or (3). If the additional crosstalk coefficients according to Eq. (2) or (3) falls below a predefined threshold for larger subcarrier distances |n−m| it can be neglected (e.g. set to 0) in some implementations in order to increase computational efficiency.

Similarly to the above described scenario, there may be scenarios where there is no significant frequency offset between transmit signal and receive signal at the TX and RX antennas (frequency aligned TX and RX symbols) but a non-negligible time offset between the multicarrier TX and RX signal (not time-aligned TX and RX symbols). This may be due to non-synchronized up- and downlink signals, for example. Additionally or alternatively, the time offset may be due to uncompensated signal travel times (time-of-flight) of the RX signal. The skilled person will appreciate that such time offsets between RX and TX can be detected or estimated with conventional methods. In such cases the SIC circuitry 330 can be configured to compute a time-offset-related frequency-domain crosstalk coefficient based on a frequency-domain representation of the time offset Δt. In some example implementations, the frequency-domain SIC circuitry 330 can be configured to compute the frequency-domain crosstalk coefficient based on weighting the frequency-domain crosstalk channel estimate with an additional time-offset-related crosstalk coefficient corresponding to $$e^{-j2\pi f \Delta t}. \quad (4)$$

In Eq. (4), f can denote a subcarrier center frequency, for example. In this way, the time-offset-related self-interference cancellation can be done per subcarrier.

The skilled person having benefit from the present disclosure will appreciate that the previously mentioned scenarios can also be combined, meaning that there can be time shift as well as frequency offset between the TX and RX signal at the transceiver antennas. This general scenario is shown in FIG. 5. The TX signal is usually shifted in both time and frequency with respect to the RX OFDM symbol window. So each RX OFDM symbol 142 interferes with parts of at least two TX OFDM symbols 102-1, 102-2. Of the first TX OFDM symbol 102-1, only the latter portion 501 is captured by the RX OFDM symbol 142, and of the second TX OFDM symbol 102-2, only the first portion 502 is captured by the RX OFDM symbol 142. Thus each TX OFDM symbol 102 can be windowed by the part that is captured, and time shifted.

Figure 7:
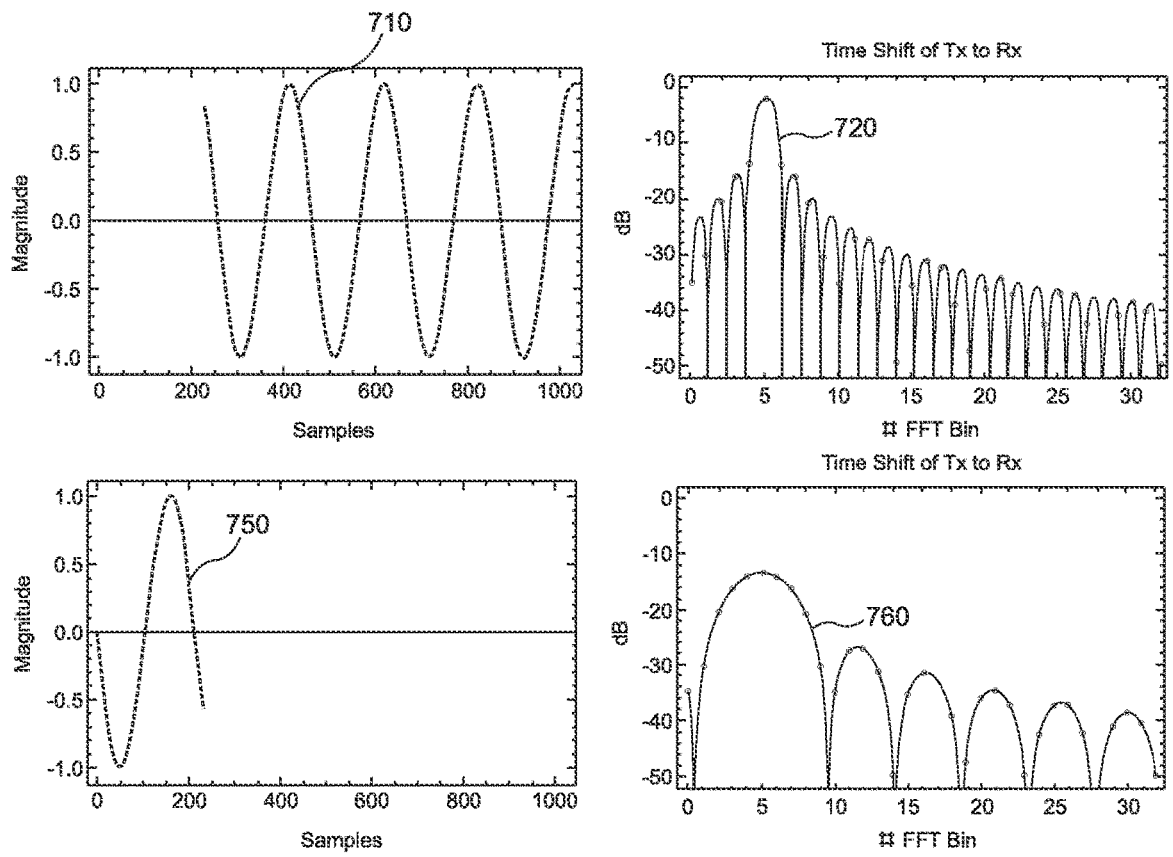
FIG. 7 shows a first windowed TX OFDM symbol in time- and frequency-domain and a second windowed TX OFDM symbol in time- and frequency-domain.
Figure 8:
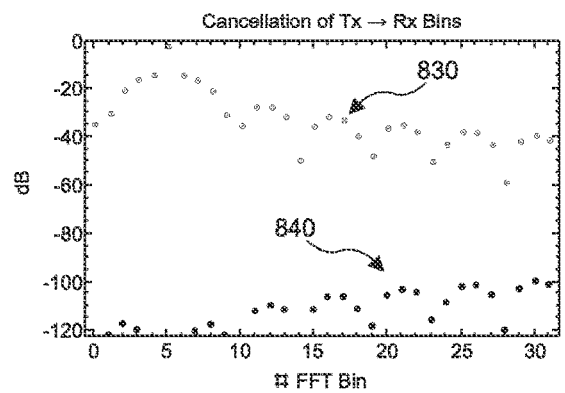
FIG. 8 shows discrete values of FIG. 7 and remaining errors after cancellation, the small error occurring since an alias compensation term is neglected.

The upper left curve 710 of FIG. 7 shows the first windowed TX OFDM symbol 102-1 in time-domain. The upper right curve 720 of FIG. 7 shows the first windowed TX OFDM symbol 102-1 in frequency-domain (seen from RX point of view). The lower left curve 750 of FIG. 7 shows the second windowed TX OFDM symbol 102-2 in time-domain. The lower right curve 760 of FIG. 7 shows the second windowed TX OFDM symbol 102-2 in frequency-domain (seen from RX point of view). Note that the discrete samples (except #5) in the upper and lower plots can have the same values. Since the effect of time and frequency shift can be calculated, their discrete time effect can be calculated as well, see FIG. 8. The discrete time values of FIG. 7 are denoted by 830, potentially remaining errors after cancellation are denoted by 840. The small error can occur since an alias compensation term has been neglected.

The corresponding analog representation of each TX OFDM symbol's contribution can then be expressed by:

$$e^{-j2\pi \Delta t (m-(\Delta f + n))} \cdot \frac{Tw_k}{T_{OFDM}} \cdot \frac{\sin\left[(m-(\Delta f + n)) \cdot \pi \cdot \frac{Tw_k}{T_{OFDM}}\right]}{(m-(\Delta f + n)) \cdot \pi \cdot \frac{Tw_k}{T_{OFDM}}} \cdot x_{n,k} \quad (5)$$

where Δf denotes a frequency shift between arbitrary OFDM subcarriers, Δt denotes the time offset between the multicarrier TX and RX signal, and $Tw_k$ the length of the overlaps 501, 502 between the respective TX OFDM symbols 102-1, 102-2 and the RX OFDM symbol 142. Note that Eq. (5) describes the analog signal with infinite response in frequency-domain, hence discrete-time sampling of it may introduce aliasing. This aliasing error, however, is very small since the FFT attenuation is usually high enough. If necessary, Eq. (5) can be enhanced by a discrete-time alias correction term depending on the FFT length. Eq. (5) as well as the addition of the alias correction term can typically be stored in a lookup-table (LUT).

In such cases with both time and frequency offsets between TX and RX, the frequency-domain SIC circuitry 330 can be configured to compute a crosstalk from OFDM TX subcarrier n to an OFDM RX subcarrier m based on a distance between the subcarriers n, m, based on the frequency offset Δf and based on the time shift Δt. In particular, the frequency-domain SIC circuitry 330 can be configured to compute the frequency-domain crosstalk from interfering OFDM TX subcarriers n to an OFDM RX subcarrier m based on weighting the frequency-domain crosstalk channel estimate $h_m$ with an additional crosstalk coefficient corresponding to $$\sum_k \sum_n e^{-j2\pi \Delta t (m-(\Delta f + n))} \cdot \frac{Tw_k}{T_{OFDM}} \cdot \frac{\sin\left[(m-(\Delta f + n)) \cdot \pi \cdot \frac{Tw_k}{T_{OFDM}}\right]}{(m-(\Delta f + n)) \cdot \pi \cdot \frac{Tw_k}{T_{OFDM}}} \cdot x_{n,k}, \quad (6)$$

where $Tw_k$ denotes a length of a temporal overlap between the k-th interfering OFDM TX symbol $x_{n,k}$ and the OFDM receive symbol and $T_{ODFM}$ denotes the duration of an OFDM symbol.

The proposed way how an RX OFDM symbol bin can be corrected can be used for all other symbol or FFT bins. The frequency offset $\Delta f$ (in Eq. (6)) between TX and RX can be the same for all FFT bins. Further, the parameters $Tw_k$ and $\Delta t$ between TX and RX can be very similar for different FFT bins. Thus all the parameters applied in Eq. (6) are nearly the same for all FFT bins. If these parameters are assumed to be equal for all FFT bins, the multiplication by the rectangular window in time-domain can be achieved by convolution of the sinc( ) function in frequency-domain, i.e., all TX FFT bins can be convolved with the same frequency-domain windowing function of Eq. (6). This assumption simplifies the frequency-domain equalizer implementation significantly.

Figure 9:
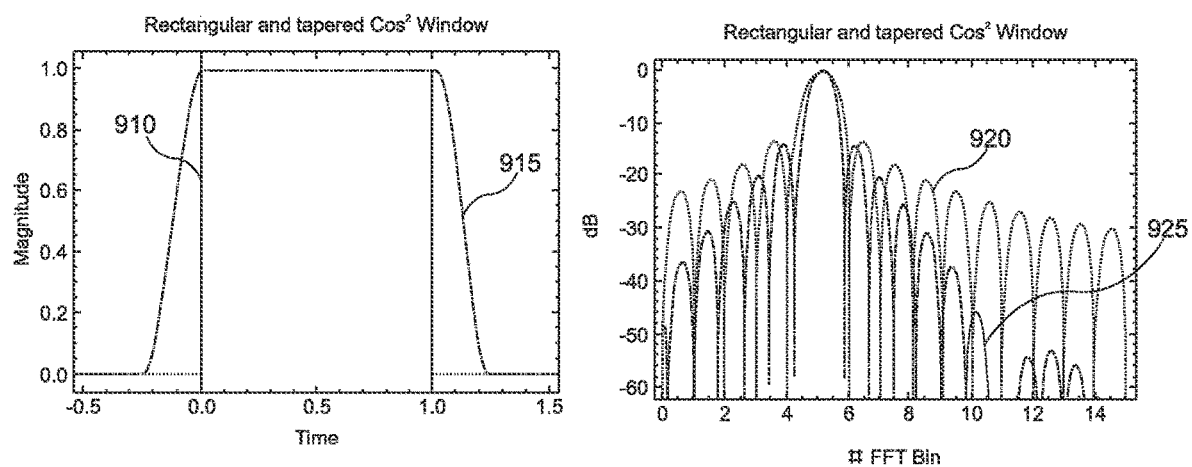
FIG. 9 shows a comparison of a rectangular window over one OFDM symbol and a tapered $Cos^2$ window in time- and frequency domain.

Optionally, a windowing function between two adjacent TX symbols can be applied in the RF-TX system to suppress the FFT out-of-band noise as well as back-folded alias components. In the example of FIG. 9 (left-hand side) a rectangular window over one OFDM symbol from zero to one is denoted by 910. To smoothen the transition, a squared cosine window 915 can be applied to the edges from −¼ to 0 and after the symbol to 5/4. The effect in the frequency-domain is denoted by 925 in FIG. 9 (right-hand side). The resulting transfer function for the rectangular window is given by above Eq. (2), whereas the resulting transfer function of the tapered cost window can be expressed by $$-\frac{2\left(\mathrm{Sin}[(f-\Delta f)\pi] + \mathrm{Sin}\left[\frac{3}{2}(f-\Delta f)\pi\right]\right)}{(-2+f-\Delta f)(f-\Delta f)(2+f-\Delta f)\pi} \quad (7)$$

Reference numeral 920 denotes the frequency response of the rectangular window according to Eq. (2) and 925 denotes the tapered cost window according to Eq. (7). It can be clearly seen that the window can significantly suppress out-of-band noise as well as aliasing.

Figure 10:
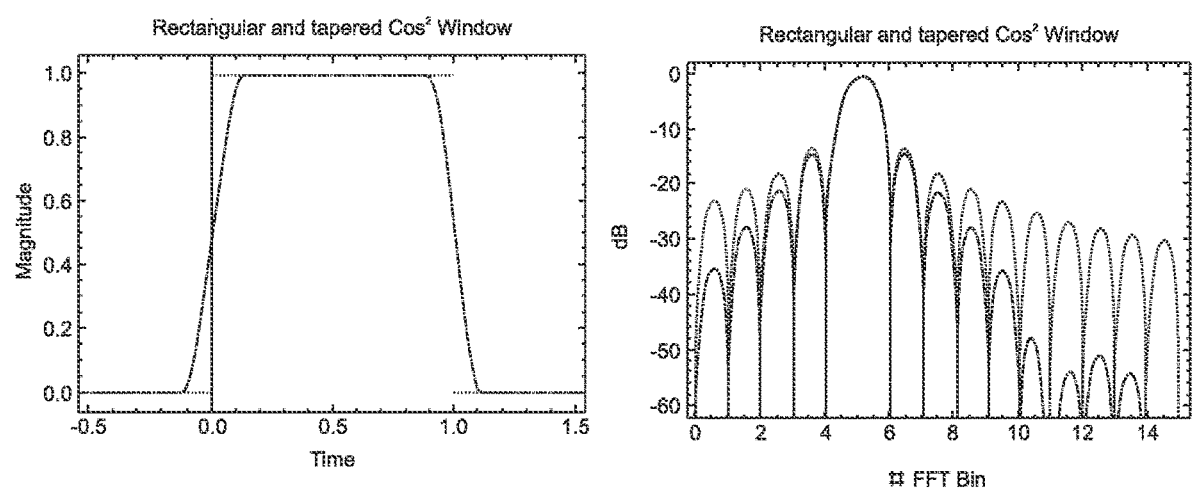
FIG. 10 shows a comparison of a rectangular window over one OFDM symbol and a tapered $Cos^2$ window with point symmetric edges in time- and frequency domain.

If integer ratios of TX PLL and TX PLL have minor frequency offset, the TX leakage may be positioned on the RX FFT grid. For such cases it can be seen from FIG. 9 that applying the window may have some disadvantage: The zeros of the transfer function may no more be positioned close to the FFT grid. Thus, according to a further aspect it is provided a window that—besides smoothing—can fulfill the other task, viz., positioning the attenuating zeros onto the FFT grid. This can be done ideally if the edge of the smoothing window is symmetric to the edge of the rectangular window (Nyquist filter), as shown in the example of FIG. 10 (left-hand side). The resulting transfer function in frequency-domain can be expressed by $$-\frac{2\left(\mathrm{Sin}\left[\frac{3}{4}(f-\Delta f)\pi\right] + \mathrm{Sin}\left[\frac{5}{4}(f-\Delta f)\pi\right]\right)}{(-2+f-\Delta f)(f-\Delta f)(2+f-\Delta f)\pi} \quad (8)$$

In FIG. 7 it is shown that the window may be much shorter than one OFDM symbol. To preserve the property that the zeros are still positioned on the FFT grid, the middle of the edges of the smoothed window can be an integer fraction of an OFDM symbol, e.g., 1, ½, ⅓, ¼~1/N length of an OFDM symbol.

A nulling of sampling in time-domain can be used for compensating of remaining group delay variations of the RF frontend. The resulting group delay can be calculated via the phase response of the FFT bins and thus determined if single FFT bins are further shifted than the nulling process in time-domain. Then additional weighting can be applied to these few FFT bins.

As mentioned before, the concept proposed in the present disclosure is not restricted to OFDM data transmission. The concept can be also used for any other system where the original symbols in frequency-domain are converted to time-domain and are then transmitted. In the receiver 320 the signal can be transformed back into frequency-domain via an inverse transform. In the literature many transformations are known beside the Fourier transform to go from frequency-domain to time-domain and vice versa, e.g. Discrete Cosine Transform, Discrete Sine Transform, Laplace Transform, Wavelet Transform, filter banks, etc. To all of them the proposed concept is applicable because it describes the mapping from one or more frequency-domain TX symbols into each of the received frequency-domain RX symbols.

In an OFDM system, each symbol is well separated in time-domain from each other; the guard interval ensures that even the echo of one symbol will be highly attenuated for the following symbol. In frequency-domain, the symbols can overlap as can be seen in FIG. 9 and FIG. 10.

Another example can by implemented by using filter banks. Here the symbols may overlap in time-domain as well as in frequency-domain. Widely used filter banks use the well-known Root-Raised-Cosine (RRC) filter for pulse shaping. For a practical system the impulse response in Eq. (8) has to be windowed to be finite. Since the impulse response of Eq. (8) is highly attenuated towards wider time offset, a rectangular window is sufficient. Thus Eq. (8) is valid inside a certain time interval of the window, outside the window the impulse response is zero. For a roll-off factor of one the impulse response h(t) can be written as:

$$\text{for} -\frac{T_P}{2} < t < \frac{T_P}{2}: \quad h(t) = \frac{4 \cdot \cos\left(\frac{2\pi t}{T_{sym}}\right)}{\pi - 16\pi\left(\frac{t}{T_{sym}}\right)^2} \quad (9)$$

$$\text{for } \frac{T_P}{2} < |t|: \quad h(t) = 0$$

Figure 11:
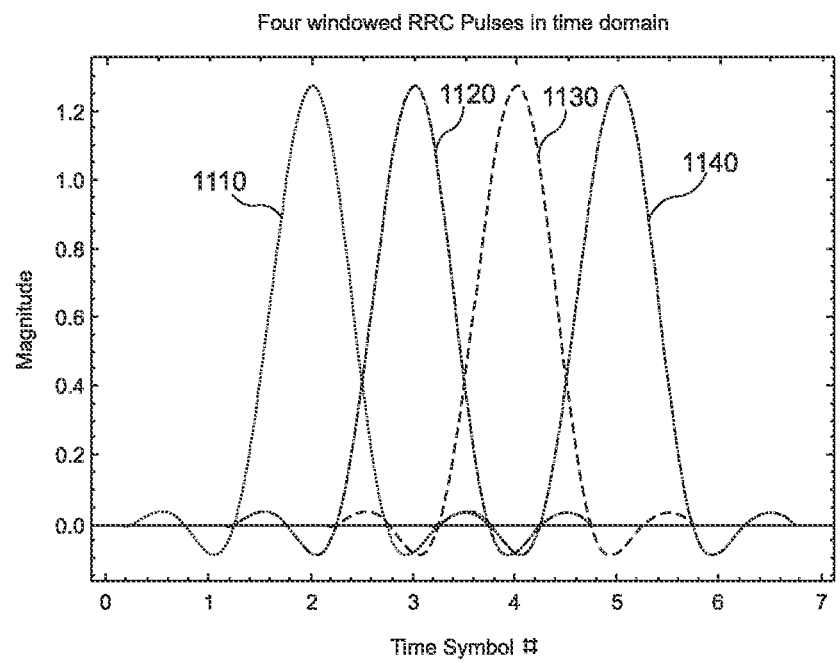
FIG. 11 shows four concatenated RRC pulses in the time-domain.

FIG. 11 shows four concatenated RRC pulses in time domain, each pulse having a width of $$T_p = 3\frac{5}{8}T_{sym}.$$

The windowed time-domain pulse of Eq. (9) can be transferred into frequency-domain according to $$H(f) = \frac{1}{2\pi}\left(\mathrm{Sin}\left[\frac{1}{2}\pi(f-\Delta f)\right]\left[\mathrm{CosIntegral}\left[\left(T_p + \frac{1}{2}\right)(f-\Delta f - 1)\pi\right] - \right.\right. \quad (10)$$

$$\mathrm{CosIntegral}\left[\left(T_p - \frac{1}{2}\right)(f-\Delta f - 1)\pi\right] -$$

$$\mathrm{CosIntegral}\left[\left(T_p + \frac{1}{2}\right)(f-\Delta f + 1)\pi\right] +$$

$$\text{CosIntegral}\left[\left(T_p - \frac{1}{2}\right)(f - \Delta f + 1)\pi\right] +$$

$$\cos\left[\frac{1}{2}\pi(f - \Delta f)\right]\left(\text{SinIntegral}\left[\left(T_p + \frac{1}{2}\right)(f - \Delta f + 1)\pi\right] +\right.$$

$$\text{SinIntegral}\left[\left(T_p - \frac{1}{2}\right)(f - \Delta f + 1)\pi\right] + \text{SinIntegral}\left[$$

$$\left.\left(T_p + \frac{1}{2}\right)(-f + \Delta f + 1)\pi\right] + \text{SinIntegral}\left[\left(T_p - \frac{1}{2}\right)(-f + \Delta f + 1)\pi\right]\right)$$

Again, $T_p$ represents the pulse length and $\Delta f$ the frequency offset.

Figure 12:
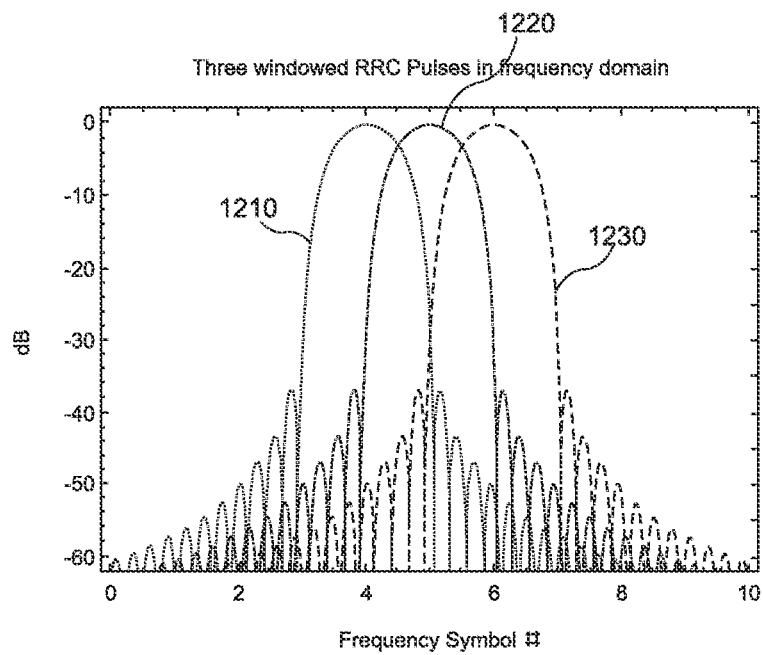
FIG. 12 shows three concatenated Root Raised Cosine (RRC) pulses in the frequency-domain.

FIG. 12 shows three neighboring RRC pulses in frequency domain, each pulse has a width of $$T_p = 3\frac{5}{8}T_{sym}.$$

For the pulses 1210, 1220, 1230 $\Delta f$ is equal to 4, 5, 6. The length $T_p$ has been chosen in a way that at the end of the pulse the value of the transfer function is close to zero to minimize the side lobes in frequency-domain. It can be seen that each RX symbol is mainly disturbed by a few adjacent symbols in time-domain as well as in frequency-domain. Please note that the receive pulse weights adjacent TX symbols shifted in time as well as in frequency.

Independent of equation (5) and equation (6) the optimization problem could be also formulated so as to find an optimum weighting of n coefficients (where 'n' is the product of 'k' neighbours in time-domain and 'l' neighbors in frequency-domain) while given a much longer frequency-domain symbol sequence via minimizing the quadratic error. For $T_p=3\frac{5}{8} T_{sym}$ four symbol direction in time-domain and three symbol direction in frequency-domain seem to be sufficient, thus 12 coefficients need to be calculated out of usually some thousands in frequency-domain.

The skilled person having benefit from the present disclosure will appreciate that the various examples described herein can be implemented individually or in combination.

Figure 13:
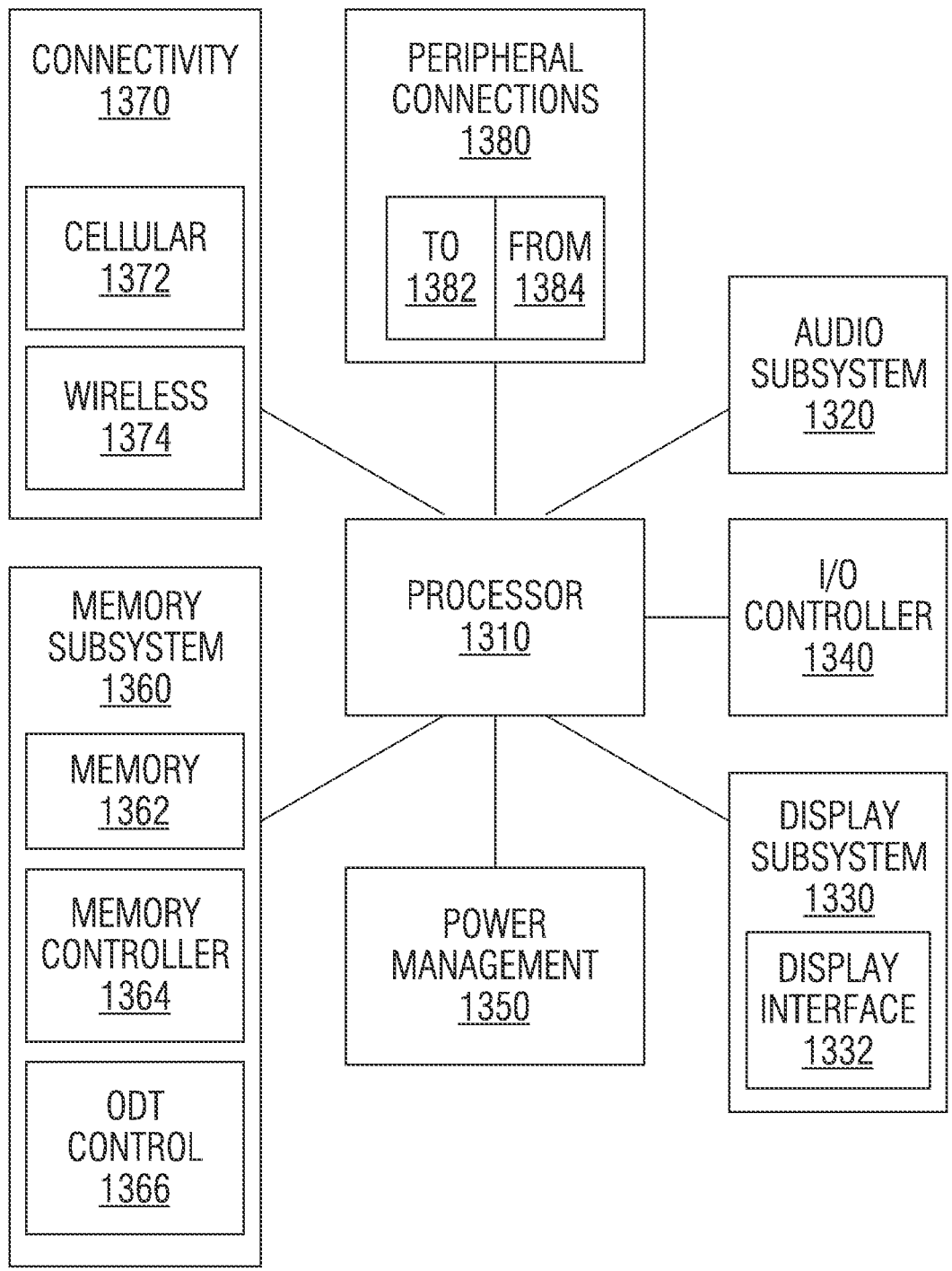
FIG. 13 shows a block diagram of a mobile device implementing examples of frequency-domain SIC according to the present disclosure.

FIG. 13 is a more detailed block diagram of an example of a device, e.g. a mobile device, in which frequency-domain SIC according to example implementations can be implemented. Device 1300 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 1300.

Device 1300 includes processor 1310, which performs the primary processing operations of device 1300. Processor 1310 can include one or more physical devices, such as microprocessors, application processors, microcontrollers, programmable logic devices, or other processing means. The processing operations performed by processor 1310 include the execution of an operating platform or operating system on which applications and/or device functions are executed. The processing operations include operations related to I/O (input/output) with a human user or with other devices, operations related to power management, and/or operations related to connecting device 1300 to another device. The processing operations can also include operations related to audio I/O and/or display I/O.

In one embodiment, device 1300 includes audio subsystem 1320, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 1300, or connected to device 1300. In one embodiment, a user interacts with device 1300 by providing audio commands that are received and processed by processor 1310.

Display subsystem 1330 represents hardware (e.g., display devices) and software (e.g., drivers) components that provide a visual and/or tactile display for a user to interact with the computing device. Display subsystem 1330 includes display interface 1332, which includes the particular screen or hardware device used to provide a display to a user. In one embodiment, display interface 1332 includes logic separate from processor 1310 to perform at least some processing related to the display. In one embodiment, display subsystem 1330 includes a touchscreen device that provides both output and input to a user. In one embodiment, display subsystem 1330 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others.

I/O controller 1340 represents hardware devices and software components related to interaction with a user. I/O controller 1340 can operate to manage hardware that is part of audio subsystem 1320 and/or display subsystem 1330. Additionally, I/O controller 1340 illustrates a connection point for additional devices that connect to device 1300 through which a user might interact with the system. For example, devices that can be attached to device 1300 might include microphone devices, speaker or stereo systems, video systems or other display device, keyboard or keypad devices, or other I/O devices for use with specific applications such as card readers or other devices.

As mentioned above, I/O controller 1340 can interact with audio subsystem 1320 and/or display subsystem 1330. For example, input through a microphone or other audio device can provide input or commands for one or more applications or functions of device 1300. Additionally, audio output can be provided instead of or in addition to display output. In another example, if display subsystem includes a touchscreen, the display device also acts as an input device, which can be at least partially managed by I/O controller 1340. There can also be additional buttons or switches on device 1300 to provide I/O functions managed by I/O controller 1340.

In one embodiment, I/O controller 1340 manages devices such as accelerometers, cameras, light sensors or other environmental sensors, gyroscopes, global positioning system (GPS), or other hardware that can be included in device 1300. The input can be part of direct user interaction, as well as providing environmental input to the system to influence its operations (such as filtering for noise, adjusting displays for brightness detection, applying a flash for a camera, or other features). In one embodiment, device 1300 includes power management 1350 that manages battery power usage, charging of the battery, and features related to power saving operation.

Memory subsystem 1360 includes memory device(s) 1362 for storing information in device 1300. Memory subsystem 1360 can include nonvolatile (state does not change if power to the memory device is interrupted) and/or volatile (state is indeterminate if power to the memory device is interrupted) memory devices. Memory 1360 can store application data, user data, music, photos, documents, or other data, as well as system data (whether long-term or temporary) related to the execution of the applications and functions of system 1300. In one embodiment, memory subsystem 1360 includes memory controller 1364 (which could also be considered part of the control of system 1300, and could potentially be considered part of processor 1310). Memory controller 1364 includes a scheduler to generate and issue commands to memory device 1362.

Connectivity 1370 includes hardware devices (e.g., wireless and/or wired connectors and communication hardware) and software components (e.g., drivers, protocol stacks) to enable device 1300 to communicate with external devices. The external device could be separate devices, such as other computing devices, wireless access points or base stations, as well as peripherals such as headsets, printers, or other devices.

Connectivity 1370 can include multiple different types of connectivity. To generalize, device 1300 is illustrated with cellular connectivity 1372 and wireless connectivity 1374. Cellular connectivity 1372 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1374 refers to wireless connectivity that is not cellular, and can include personal area networks (such as Bluetooth), local area networks (such as WiFi), and/or wide area networks (such as WiMax), or other wireless communication, such as NFC. Wireless communication refers to transfer of data through the use of modulated electromagnetic radiation through a non-solid medium. Wired communication occurs through a solid communication medium. Cellular connectivity 1372 and/or wireless connectivity 1374 can implement example transceivers of the present disclosure for frequency-domain SIC cancellation.

Peripheral connections 1380 include hardware interfaces and connectors, as well as software components (e.g., drivers, protocol stacks) to make peripheral connections. It will be understood that device 1300 could both be a peripheral device ("to" 1382) to other computing devices, as well as have peripheral devices ("from" 1384) connected to it. Device 1300 commonly has a "docking" connector to connect to other computing devices for purposes such as managing (e.g., downloading and/or uploading, changing, synchronizing) content on device 1300. Additionally, a docking connector can allow device 1300 to connect to certain peripherals that allow device 1300 to control content output, for example, to audiovisual or other systems.

In addition to a proprietary docking connector or other proprietary connection hardware, device 1300 can make peripheral connections 1380 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

The following examples pertain to further embodiments.

Example 1 is a multicarrier transceiver. The transceiver comprises a transmitter which includes transformation circuitry configured to transform a frequency-domain TX symbol from frequency-domain to time-domain to generate a time-domain transmit signal. The transceiver also comprises a receiver which includes inverse transformation circuitry configured to transform a time-domain receive signal from time-domain to frequency-domain to generate a frequency-domain receive symbol. Self-interference cancellation circuitry is coupled between the transmitter and the receiver. The self-interference cancellation circuitry is configured to modify the frequency-domain RX symbol based on at least one frequency-domain TX symbol and a frequency-domain crosstalk channel estimate of a crosstalk channel from the transmitter to the receiver. In other words, the self-interference cancellation circuitry completely operates in the frequency domain and computations are performed using frequency-domain representations of the transmit and receive signals.

Generally, the transmitter's transformation circuitry can implement any kind of frequency-time-transformation. Likewise, the receiver's inverse transformation circuitry can implement any kind of time-frequency-transformation matching the transmitter's frequency-time-transformation. Thus, in Example 2, the transmitter's transformation circuitry can be configured to transform the frequency-domain TX symbol from frequency domain to time domain via one of an inverse Fourier transform, an inverse Wavelet transform, an inverse Laplace transform, an inverse Cosine transform, or a Filter bank. The receiver's inverse transformation circuitry can be configured to transform the time-domain transmit signal from time domain to frequency domain based on one of a Fourier transform, a Wavelet transform, a Laplace transform, a Cosine transform, or a Filter bank.

In Example 3, the transceiver of Examples 1 or 2 can be an OFDM transceiver comprising an OFDM transmitter portion and an OFDM receiver portion. The OFDM transmitter portion comprises an Inverse Fast Fourier Transform (IFFT) processor which configured to transform an OFDM frequency-domain TX symbol to an OFDM time-domain transmit signal. The OFDM receiver portion comprises a Fast Fourier Transform (FFT) processor which is configured to transform an OFDM time-domain receive signal to an OFDM frequency-domain receive symbol. The self-interference cancellation circuitry in the example is configured to modify the OFDM frequency-domain RX symbol based on at least the OFDM frequency-domain TX symbol and a frequency-domain crosstalk channel estimate of a crosstalk channel from the transmitter to the receiver.

In a simple case of frequency-domain SIC, where there are essentially no significant frequency and time shifts between transmit signal and receive signal, the frequency-domain TX symbol can be weighted with the frequency-domain crosstalk channel estimate and subtracted from the frequency-domain RX symbol in order to cancel the self-interference. The skilled person having benefit from the present disclosure will appreciate that the frequency-domain crosstalk channel estimate can be estimated using conventional methods. In one example, known pilot symbols can be used for crosstalk channel estimation, such as least-squares (LS) channel estimation, for example. The skilled person will further appreciate that, depending on the circumstances, the crosstalk channel can be different for different subcarriers of a multicarrier signal, such as an OFDM signal.

There may be scenarios where there is no significant time shift between transmit signal and receive signal at TX and RX antennas (temporally aligned TX and RX symbols) but a non-negligible (carrier) frequency offset between the TX and RX signal. This may be due to different up- and downlink frequencies, for example. Additionally or alternatively such a frequency offset may be due to Doppler shifts. In Example 4, the self-interference cancellation circuitry of any one of the previous Examples can be configured to compute a crosstalk from an OFDM transmit signal subcarrier n to an OFDM receive signal subcarrier m based on a distance between the subcarriers n, m and based on the frequency offset Δf. Typically, the frequency offset Δt between TX and RX may be known due to predefined system parameters and/or due to Doppler frequency offset estimation techniques.

In Example 5, the self-interference cancellation circuitry of any one of the previous Examples can be configured to compute the crosstalk from OFDM transmit signal subcarrier n to OFDM receive signal subcarrier m based on weighting the frequency-domain crosstalk channel estimate with an additional crosstalk coefficient corresponding to $$\frac{\sin[(m-(\Delta f+n))\pi]}{(m-(\Delta f+n))\pi}$$

If the additional crosstalk coefficients according to above Eq. fall below a predefined threshold for certain subcarrier distances |n−m| they can be neglected in some implementations in order to increase computational efficiency.

Similarly to the above mentioned scenario, there may be scenarios where there is no significant frequency offset between transmit signal and receive signal at the TX and RX antennas (frequency aligned TX and RX symbols) but a non-negligible time offset between the TX and RX signal (not time-aligned TX and RX symbols). This may be due to non-synchronized up- and downlink signals, for example. Additionally or alternatively the time offset may be due to uncompensated signal travel times (time-of-flight) of the RX signal. The skilled person will appreciate that such time offsets between RX and TX can be detected or estimated with conventional methods. In Example 6, the self-interference cancellation circuitry of any one of the previous Examples can be configured to compute a time-offset-related frequency-domain crosstalk coefficient based on a frequency-domain representation of the time offset Δt. In some example implementations, the self-interference cancellation circuitry can be configured to compute the frequency-domain crosstalk coefficient based on weighting the frequency-domain crosstalk channel estimate with an additional time-offset-related crosstalk coefficient corresponding to $$e^{-j2\pi f\Delta t}$$

Here, f can denote a subcarrier center frequency, for example. In this way, the time-offset-related self-interference cancellation can be done per subcarrier.

The skilled person having benefit from the present disclosure will appreciate that the previously mentioned scenarios can also be combined, meaning that there can be time shift as well as frequency offset between the TX and RX signal at the antennas. In Example 7, the self-interference cancellation circuitry of any one of the previous Examples can be configured to compute a crosstalk from a subcarrier n of the multicarrier transmit signal to a subcarrier m of the multicarrier receive signal based on a distance between the subcarriers n, m, based on the frequency offset Δf and based on the time shift Δt.

In Example 8, the self-interference cancellation circuitry of any one of the previous Examples can be configured to compute the frequency-domain crosstalk from an OFDM TX symbol to the OFDM RX symbol based on weighting the frequency-domain crosstalk channel estimate with an additional crosstalk coefficient based on $$e^{-j2\pi\Delta t(m-(\Delta f+n))} \cdot \frac{Tw_k}{T_{OFDM}} \cdot \frac{\sin\left[(m-(\Delta f+n))\cdot \pi \cdot \frac{Tw_k}{T_{OFDM}}\right]}{(m-(\Delta f+n))\cdot \pi \cdot \frac{Tw_k}{T_{OFDM}}},$$

where $$\frac{Tw_k}{T_{OFDM}}$$

denotes a normalized length of a temporal overlap between the OFDM TX symbol and the OFDM receive symbol.

Example 8 is a mobile device comprising a multicarrier transceiver of any one of the previous Examples. The skilled person having benefit from the present disclosure will appreciate that the proposed concept of frequency-domain self-interference cancellation can as well be applied to base stations. Thus, the present disclosure also provides a base station comprising a multicarrier transceiver of any one of the previous examples.

Example 9 is a self-interference mitigation method for a multicarrier transceiver. The method includes transforming a frequency-domain multicarrier TX symbol from frequency domain to time domain to generate a multicarrier transmit signal. The method further includes transforming a multicarrier receive signal from time-domain to frequency-domain to generate a frequency-domain multicarrier receive symbol. The frequency-domain multicarrier RX symbol is modified based on at least the frequency-domain multicarrier TX symbol and a frequency-domain crosstalk channel estimate of a crosstalk channel from a transmitter portion to a receiver portion of the multicarrier transceiver.

Example 10 is a computer program having a program code for carrying out various examples of the above method, when the computer program is executed on a programmable hardware device.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A transceiver, comprising
    a transmitter comprising transformation circuitry configured to transform a frequency-domain transmit symbol from frequency domain to time domain to generate a time-domain transmit signal;
    a receiver comprising inverse transformation circuitry configured to transform a time-domain receive signal from time domain to frequency domain to generate a frequency-domain receive symbol; and
    self-interference cancellation circuitry configured to modify the frequency-domain receive symbol based on at least one frequency-domain transmit symbol and a frequency-domain crosstalk channel estimate of a crosstalk channel between the transmitter and the receiver.

2. The transceiver of claim 1, wherein the transformation circuitry is configured to transform the frequency-domain transmit symbol from frequency domain to time domain via one of an inverse Fourier transform, an inverse Wavelet transform, an inverse Laplace transform, an inverse Cosine transform, or a Filter bank, and
    wherein the inverse transformation circuitry is configured to transform the time-domain transmit signal from time domain to frequency domain based on one of a Fourier transform, a Wavelet transform, a Laplace transform, an Cosine transform, or a Filter bank.

3. The transceiver of claim 1, wherein the transceiver is a multicarrier transceiver, wherein a carrier frequency of a multicarrier time-domain transmit signal and a carrier frequency of a multicarrier time-domain receive signal are shifted by a frequency shift $\Delta f$, and
    wherein the self-interference cancellation circuitry is configured to compute a crosstalk from a multicarrier transmit signal subcarrier n to a multicarrier receive signal subcarrier m based on a distance between the subcarriers n, m and based on the frequency shift $\Delta f$.

4. The transceiver of claim 3, wherein the transceiver is an OFDM transceiver, wherein the self-interference cancellation circuitry is configured to compute the crosstalk from OFDM transmit signal subcarrier n to OFDM receive signal subcarrier m based on weighing the frequency-domain crosstalk channel estimate with an additional crosstalk coefficient comprising $$\frac{\sin[(m - (\Delta f + n))\pi]}{(m - (\Delta f + n))\pi}.$$

5. The transceiver of claim 3, wherein a timing of the multicarrier time-domain transmit signal is shifted vis-à-vis the multicarrier time-domain receive signal by a time shift $\Delta t$, and wherein the self-interference cancellation circuitry is configured to compute a frequency-domain crosstalk coefficient corresponding to a crosstalk from the multicarrier time-domain transmit signal to the multicarrier time-domain receive signal based on a frequency-domain representation of the time shift $\Delta t$.

6. The transceiver of claim 5, wherein the self-interference cancellation circuitry is configured to compute the frequency-domain crosstalk coefficient for a subcarrier with frequency f based on weighing the frequency-domain crosstalk channel estimate with an additional crosstalk coefficient corresponding to $e^{-j2\pi f \Delta t}$.

7. The transceiver of claim 1, wherein a transmit carrier frequency and a receive carrier frequency are shifted by a frequency shift $\Delta f$ and a timing of a multicarrier transmit signal is shifted vis-à-vis a multicarrier receive signal by a time shift $\Delta t$, wherein the self-interference cancellation circuitry is configured to compute a crosstalk from a subcarrier n of the multicarrier transmit signal to a subcarrier m of the multicarrier receive signal based on a distance between the subcarriers n, m, the frequency shift $\Delta f$, and the time shift $\Delta t$.

8. The transceiver of claim 7, wherein the transceiver is an OFDM transceiver, wherein the self-interference cancellation circuitry is configured to compute the crosstalk from the OFDM transmit signal to the OFDM receive signal based on $$e^{-j2\pi\Delta t(m-(\Delta f+n))} \cdot \frac{Tw_k}{T_{OFDM}} \cdot \frac{\sin\left[(m-(\Delta f+n))\cdot \pi \cdot \frac{Tw_k}{T_{OFDM}}\right]}{(m-(\Delta f+n))\cdot \pi \cdot \frac{Tw_k}{T_{OFDM}}},$$

$$\frac{Tw_k}{T_{OFDM}}$$

denoting a normalized length of a temporal overlap between the OFDM transmit symbol and the OFDM receive symbol.

9. The transceiver of claim 1, wherein the self-interference cancellation circuitry is configured to estimate the frequency-domain crosstalk channel estimate based on a transmission of pilot symbols.

10. A mobile device comprising:
a transceiver comprising:
a transmitter comprising transformation circuitry configured to transform a frequency-domain transmit symbol from frequency domain to time domain to generate a time-domain transmit signal;
a receiver comprising inverse transformation circuitry configured to transform a time-domain receive signal from time domain to frequency domain to generate a frequency-domain receive symbol; and
self-interference cancellation circuitry configured to modify the frequency-domain receive symbol based on at least one frequency-domain transmit symbol and a frequency-domain crosstalk channel estimate of a crosstalk channel between the transmitter and the receiver; and
a processor communicatively coupled to the transceiver and configured to perform primary processing operations of the device.

11. The mobile device of claim 10, wherein the transformation circuitry is configured to transform the frequency-domain transmit symbol from frequency domain to time domain via one of an inverse Fourier transform, an inverse Wavelet transform, an inverse Laplace transform, an inverse Cosine transform, or a Filter bank, and
wherein the inverse transformation circuitry is configured to transform the time-domain transmit signal from time domain to frequency domain based on one of a Fourier transform, a Wavelet transform, a Laplace transform, an Cosine transform, or a Filter bank.

12. The mobile device of claim 10, wherein the transceiver is a multicarrier transceiver, wherein a carrier frequency of a multicarrier time-domain transmit signal and a carrier frequency of a multicarrier time-domain receive signal are shifted by a frequency shift $\Delta f$, and
wherein the self-interference cancellation circuitry is configured to compute a crosstalk from a multicarrier transmit signal subcarrier n to a multicarrier receive signal subcarrier m based on a distance between the subcarriers n, m and based on the frequency shift $\Delta f$.

13. The mobile device of claim 10, wherein a transmit carrier frequency and a receive carrier frequency are shifted by a frequency shift $\Delta f$ and a timing of a multicarrier transmit signal is shifted vis-à-vis a multicarrier receive signal by a time shift $\Delta t$, wherein the self-interference cancellation circuitry is configured to compute a crosstalk from a subcarrier n of the multicarrier transmit signal to a subcarrier m of the multicarrier receive signal based on a distance between the subcarriers n, m, the frequency shift $\Delta f$, and the time shift $\Delta t$.

14. The mobile device of claim 10, wherein the transceiver is an OFDM transceiver, wherein the self-interference cancellation circuitry is configured to compute the crosstalk from the OFDM transmit signal to the OFDM receive signal based on $$e^{-j2\pi\Delta t(m-(\Delta f+n))} \cdot \frac{Tw_k}{T_{OFDM}} \cdot \frac{\sin\left[(m-(\Delta f+n))\cdot \pi \cdot \frac{Tw_k}{T_{OFDM}}\right]}{(m-(\Delta f+n))\cdot \pi \cdot \frac{Tw_k}{T_{OFDM}}},$$

$$\frac{Tw_k}{T_{OFDM}}$$

denoting a normalized length of a temporal overlap between the OFDM transmit symbol and the OFDM receive symbol.

15. The mobile device of claim 10, wherein the self-interference cancellation circuitry is configured to estimate the frequency-domain crosstalk channel estimate based on a transmission of pilot symbols.

16. A base station comprising:
a transmitter comprising transformation circuitry configured to transform a frequency-domain transmit symbol from frequency domain to time domain to generate a time-domain transmit signal;
a receiver comprising inverse transformation circuitry configured to transform a time-domain receive signal from time domain to frequency domain to generate a frequency-domain receive symbol; and
self-interference cancellation circuitry configured to modify the frequency-domain receive symbol based on at least one frequency-domain transmit symbol and a frequency-domain crosstalk channel estimate of a crosstalk channel between the transmitter and the receiver.

17. The base station of claim 16, the transformation circuitry is configured to transform the frequency-domain transmit symbol from frequency domain to time domain via one of an inverse Fourier transform, an inverse Wavelet transform, an inverse Laplace transform, an inverse Cosine transform, or a Filter bank, and
wherein the inverse transformation circuitry is configured to transform the time-domain transmit signal from time domain to frequency domain based on one of a Fourier transform, a Wavelet transform, a Laplace transform, an Cosine transform, or a Filter bank.

18. The base station of claim 16, wherein a carrier frequency of a multicarrier time-domain transmit signal and a carrier frequency of a multicarrier time-domain receive signal are shifted by a frequency shift $\Delta f$, and wherein the self-interference cancellation circuitry is configured to compute a crosstalk from a multicarrier transmit signal subcarrier n to a multicarrier receive signal subcarrier m based on a distance between the subcarriers n, m and based on the frequency shift $\Delta f$.

19. The base station of claim 16, wherein a transmit carrier frequency and a receive carrier frequency are shifted by a frequency shift $\Delta f$ and a timing of a multicarrier transmit signal is shifted vis-à-vis a multicarrier receive signal by a time shift $\Delta t$, wherein the self-interference cancellation circuitry is configured to compute a crosstalk from a subcarrier n of the multicarrier transmit signal to a subcarrier m of the multicarrier receive signal based on a distance between the subcarriers n, m, the frequency shift $\Delta f$, and the time shift $\Delta t$.

20. The base station of claim 16, wherein the self-interference cancellation circuitry is configured to estimate the frequency-domain crosstalk channel estimate based on a transmission of pilot symbols.

* * * * *